Fig. 1

William R. Mercer
Martin R. Richmond
*INVENTOR.*

BY

Attorney

William R. Mercer
Martin R. Richmond
INVENTOR.

Attorney

Fig. 5

William R. Mercer
Martin R. Richmond
INVENTOR.

BY
Attorney

Fig. 6

Nov. 16, 1965  W. R. MERCER ETAL  3,218,639
NON-SCANNING PANORAMIC RADAR SYSTEM
Filed May 3, 1955  9 Sheets-Sheet 5

Fig. 7

William R. Mercer
Martin R. Richmond
INVENTORS

BY
Attorney

Fig. 8

William R. Mercer
Martin R. Richmond
INVENTOR.

Nov. 16, 1965    W. R. MERCER ETAL    3,218,639
NON-SCANNING PANORAMIC RADAR SYSTEM
Filed May 3, 1955    9 Sheets-Sheet 7

Fig. 9

William R. Mercer
Martin R. Richmond
INVENTOR.
BY
Attorney

Fig. 10

William R. Mercer
Martin R. Richmond
INVENTOR.

BY

Attorney

Fig. 11

William R. Mercer
Martin R. Richmond
INVENTOR.

BY 
Attorney 3,218,639
NON-SCANNING PANORAMIC RADAR SYSTEM
William R. Mercer, Belmont, Mass., and Martin R. Richmond, Nashua, N.H., assignors to Sanders Associates, Incorporated, Nashua, N.H., a corporation of Massachusetts
Filed May 3, 1955, Ser. No. 505,776
5 Claims. (Cl. 343—7)

The present invention relates to radio signaling of the type heretofore generally known as radar. More particularly, this invention relates to panoramic radar embracing a non-scanning, omnidirectional, target search, detection and tracking system.

The ability of conventional radars employing pencil scanning beams to cover a relatively large volume of space is severely limited. The determination of the presence of a target in such a prior art system requires a communication channel capacity or bandwidth sufficiently great to establish not only where the target is, but where it is not. These limitations are dramatically presented when one considers the problem of searching a volume of space 360° in azimuth and 60° in elevation with a 1° pencil beam in one second. This requires that 60 x 360 or 21,600 beam elements be scanned each second, implicitly defining the time on a target as 46 microseconds. It is to be noted, however, that this presents a constraint on the effective range of the system due to the necessity of scanning. If this scanning is eliminated, the effective inherent range constraint is simply a function of the speed of light.

Conventional scanning radar systems are further limited in that the number of targets that can be simultaneously detected is limited to those which are located in a single direction. Furthermore, such systems are capable of tracking only a single target at a time. Thus, in the case of a 1° pencil beam searching 360° in azimuth and 60° in elevation to locate a target within 100 feet in range, searching 100,000 feet and within a velocity of 10 feet per second while searching velocities up to 5000 feet per second, it would require 300 hours to scan the entire range, azimuth, elevation and velocity space and an enormous power. Since the radar would "see" a target only once in 300 hours for a time of .1 microsecond, an effective average power of only 30 watts would require a peak power of $9 \times 10^{10}$ watts, 90,000 megawatts. Clearly conventional radar systems are incapable of meeting modern target detection requirements. The radar system in accordance with the present invention is designed to satisfy modern-day needs.

It is therefore an object of the present invention to provide an improved radio signaling method and system embodying omnidirectional transmission and reception of radio signals.

A further object of the invention is to provide an improved system capable of simultaneously detecting the presence of a plurality of targets in a plurality of directions.

A still further object of the invention is to provide an improved system which is capable of simultaneously providing range, velocity, vertical angle and horizontal angle informations for a plurality of targets.

A further object of the invention is to provide an improved system having a receiving antenna presenting a maximum capture area.

A still further object of the invention is to provide an improved system and method of signaling requiring a minimum receiver bandwidth to provide indications of the presence of a target.

A further object of the invention is to provide an improved radio signaling system and method of simultaneously detecting and providing continuous information of the presence, locations and velocities of a plurality of targets at a reasonably low power.

Other and further objects of the invention will be apparent from the following description of a preferred embodiment, taken in connection with the accompanying drawings.

In systems known in the prior art as coherent radar, the phase of the received energy reflected from a moving target bears a known relation to the phase of the energy when transmitted. In accordance with the well-known Doppler principles the reflected energy from an approaching target is characterized by an increased frequency. The Doppler frequency difference between the transmitted and received energies is directly proportional to the relative radial velocity of the target and provides an extremely narrow band indication of the presence of a target. The present invention employs as one of its basic features the combination of prior art coherent radar detection techniques with a relatively stationary panoramic or omnidirectional radiator.

The present invention is further distinguishable from the prior art in that it utilizes a relatively stationary panoramic or omnidirectional radiator in combination with a multi-unit steerable receiving antenna (hereinafter termed MUSA in accordance with the usage of the art) which provides a common aperture for all received energies. This renders possible the simultaneous formation in the receiver of a plurality of fixed "virtual" beams (preferred directions of receiver response) without loss of efficiency and with an enhanced signal-to-noise ratio. These fixed virtual beams are termed "guard beams" herein. A plurality of guard beams each search contiguous volume increments of space and provide simultaneous, omnidirectional target searching.

Another distinguishing feature of the system of the present invention is its ability to locate a moving target without searching the entire volume of space within its operating range. This is readily accomplished by confining the search to only a peripheral area, or outer shell, of a defined volume, since any target within the defined volume is presumed to have entered via the shell. This outer shell is termed "guard shell" herein. The guard shell is developed by actuating the receiver only after a predetermined time interval succeeding each transmitted pulse to respond to a predetermined range and by actuating for a predetermined time duration to provide a depth in range at the predetermined range.

Utilizing the Doppler effect for detection of the target, in combination with the above search techniques, tremendously diminishes the required receiver bandwidth since the possible velocities obtainable by a desired target, such as an aircraft, as represented by a range of Doppler frequencies, extends over a relatively narrow range. The apparatus and method required for such target detection are correspondingly simplified.

Since the travel distance of a target within the guard shell is known, the volume of space through which the target can proceed within a given time, for example one second, is thus known. This volume increment of space is continuously searched by a single guard beam in the present system.

The utilization of uniform, omnidirectional radiation in the system of the present invention enormously reduces the power requirement for a given operating range. Although very little antenna gain is realized with such omnidirectional radiation, the useful signal-to-noise ratio compares very favorably with radar having conventional scanning, pencil beam radiators. This results from the well known relation that the useful signal derived from a target depends upon the average time on target of the transmitted energy. There is an obvious equivalence between applying a large amount of power for a relatively short time and applying a relatively small amount of power continuously. The guard or search channel of the present invention eliminates the need for scanning by utilizing panoramic radiation in combination with a plurality of guard beams searching contiguous volume increments of space within the guard shell. The presence of a moving target in such a volume increment is instantly indicated by the appearance of a Doppler frequency which is utilized to provide an alarm signal. The alarm signal is employed to assign a tracking channel to the target which provides continuous range, vertical angle, horizontal angle and velocity informations of approaching targets. It will be seen that the speed with which the system of the present invention is capable of detecting the presence of a moving target is above conventional scanning, pencil beam radars by orders of magnitude.

In accordance with the present invention, therefore, there is provided a method of radio signaling which comprises panoramically radiating electromagnetic energy and receiving reflections of this energy from remote targets. The reception is controlled to be most responsive to signals reflected from the targets. Variations in characteristics of the desired received energy from corresponding characteristics of the energy when radiated or detected provide the desired indications of the locations and velocities of the targets. In preferred embodiments of the invention the energy is coherently transmitted and detected. Also the energy received is that reflected from targets within an area at a predetermined distance from the point of radiation. Moreover, the Doppler variations between the radiated and reflecting energy effected by movement of the target within the guard ring are detected.

It will thus be seen that in accordance with the present invention there is provided a system for radio signaling which comprises a transmitter for panoramically radiating electromagnetic energy, receiving means responsive to reflections of this energy from a remote target, means for controlling the receiving means to effect a maximum response thereof in the direction of the target and means for detecting differences in characteristics of the directively received energy relative to corresponding characteristics of the energy when radiated. Preferably, the receiving means is responsive to reflections of energy from within a remote predetermined area and the directive beams are responsive to the Doppler variations as aforesaid.

In the accompanying drawings:

FIGS. 10(a), (b), (c), (d), (e), (f), (g) and (h) are curves illustrating aspects of the operation of velocity and range tracking in the present invention.

Figure 1:
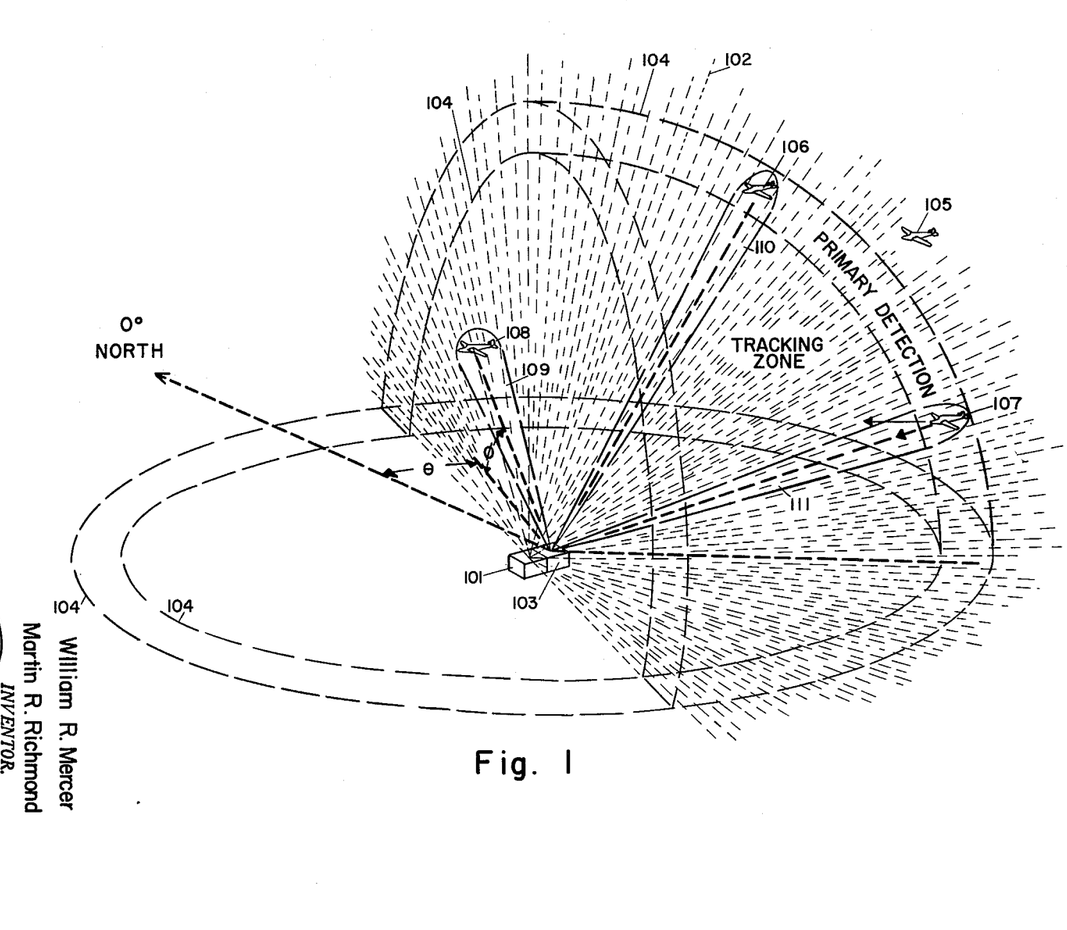
FIG. 1 is a schematic diagram illustrating in perspective certain aspects of the operation of the present invention.

Referring now in more detail to the drawings, and with particular reference to FIG. 1, a panoramic transmitter 101 is adapted to radiate pulses of microwave electromagnetic energy omnidirectionally as indicated by dashed lines 102. The term "panoramic" as used herein includes radiation in a pattern subtending a substantial solid angle of space as distinguished from that normally associated with conventional, scanning, directive beam radars. A conventional radar system, for example, rarely utilizes a beam of energy with an angle greater than 5° between 3 db points. For purposes of greater clarity the radiation pattern as illustrated in FIG. 1 is shown as occupying only the single spherical quadrant. Actually, the hemisphere having a base defined by ring 104 is occupied.

A receiver 103 is adapted to receive reflections of the energy from remote targets. Such a receiver utilizes the well-known multiple-unit steerable antenna array commonly known and hereinafter referred to as a MUSA system, and substantially as disclosed in U.S. Patent #2,245,660 to Feldman et al. At the outer circumference of the sphere which surrounds the transmitter, there is located a guard shell region, indicated by the heavy dashed lines 104 This region is the area of primary detection of moving targets. An aircraft 105 is shown outside the guard shell region, that is, beyond the selected region of response of the receiver 103. Aircrafts 106 and 107 are shown within the guard shell region, where the receiver is capable of simultaneously detecting their presence and assigning trackers to them as presently to be explained. Aircraft 108 is within the tracking zone at the inside of the guard shell region and is shown being followed by a virtual tracking beam indicated at 109. All of these functions of the receiver occur simultaneously not sequentially as in conventional radar receivers. Once detected the system is capable of simultaneously tracking each target in azimuth angle $\theta$, elevation angle $\phi$, range R (radial distance from the receiver to the target) and relative radial velocity V. The virtual tracking beams indicated at 109, 110 and 111 are each derived through the common aperture provided by the MUSA circuits.

In the preferred embodiment of the invention time duplexing pulse radiation and reception is utilized with phase coherence from pulse to pulse; that is, the phase of the transmitted energy as between pulses is predetermined and known at all times. Any variation in frequency of received energy is coherently detected in the receiver to ascertain the incremental Doppler frequency resultant from the motion of the target.

The guard shell as mentioned above is derived by gating the receiver in range; that is, causing the receiver to be responsive during a predetermined time after predetermined time intervals following the transmitted pulses. Thus, for example, the inside radius of the guard shell may be 10 miles and its depth may be 2000 feet. The elapsed round-trip travel time of the transmitted energy corresponds to the distance traveled, being approximately 10 microseconds per mile of range. The pulse repetition rate may be 5000 per second and the duration of each pulse, the pulse width, may be 2 microseconds. If it is then desired to receive energy from a distance 10 miles away for 2000 feet of incremental range, the receiver is gated on 100 microseconds after each pulse of energy is transmitted and remains on for 4 microseconds. Thus, if an indication of a target is received at all, its range at that time is instantly known within a distance of 2000 feet.

The primary alarm indication is provided by the incremental Doppler frequency produced by a target moving relative to the receiver within the guard shell. In accordance with the well-known Doppler principles, a target moving toward the receiver produces an echo or reflection of the transmitted energy which is characterized by an increased frequency of the pulses over that of their transmitted frequency, and this increase is proportional to the radial velocity of the moving target relative to the receiver.

In accordance with the well-known coherent detection techniques, the transmitter and receiver are so coupled as to permit a comparison between the energies as transmitted and received. By heterodyning the two energies a difference frequency is produced, hereafter termed the Doppler frequency signal, which is proportional to the scalar value of its radial velocity vector relative to the receiver. It will be seen that the radial motion relative to the receiver 103 of a remote target located within the guard shell provides the primary detection or alarm signal. The initial range and velocity of the craft is thus known and continuous range indications are readily obtainable from continuous velocity indications. This is accomplished by integrating the radial velocity with respect to time. The range R is then equal to the distance D from the receiver to the guard shell minus the distance d traveled.

Figure 2:
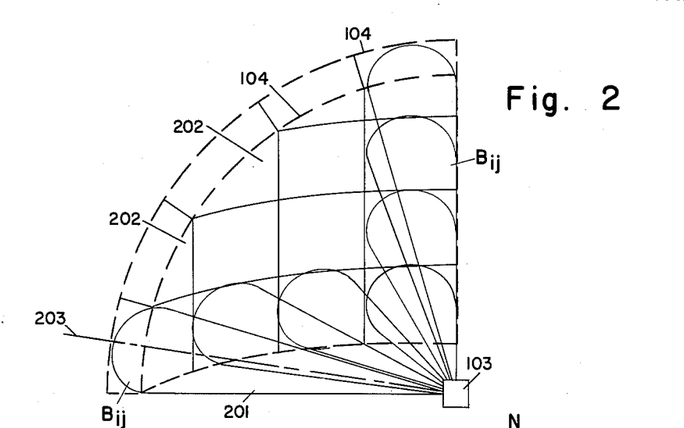
FIG. 2 is a three-dimensional schematic diagram illustrating the guard beams of the present invention.
Figure 3:
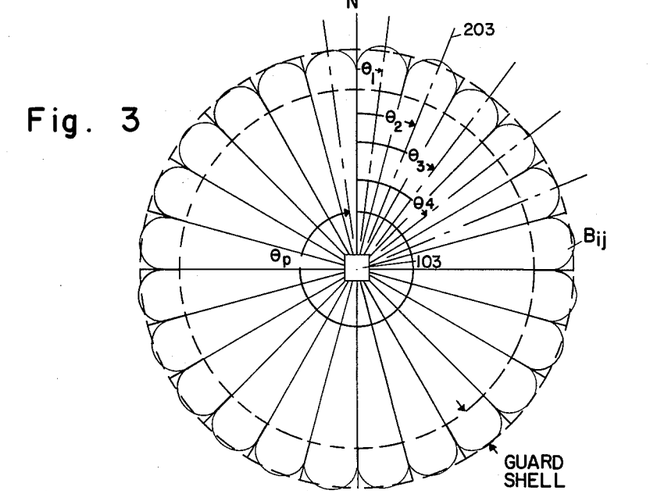
FIG. 3 is a plan view schematic diagram illustrating the guard beams taken along a horizontal plane.
Figure 4:
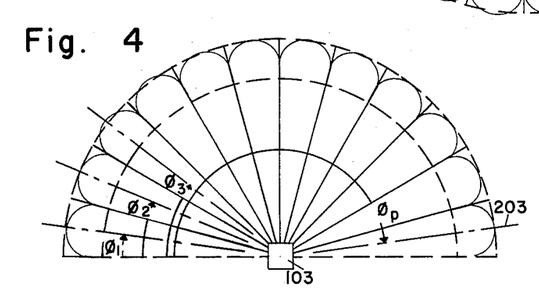
FIG. 4 is an elevational view of the guard beams in the present invention taken along a vertical plane.

A plurality of fixed guard beams 201 are illustrated in FIGS. 2, 3, and 4. As shown in FIG. 2, the beams 201 201 define contiguous incremental volumes of space 202 within the guard shell as indicated by the dashed lines 104. These guard beams are derived in the receiver using the common aperture provided by the MUSA system and are continuously alert in each of the incremental volumes in directions defined by their central axes 203. The direction of each central axis 203 is defined by its horizontal angle $\theta_1$, $\theta_2$, . . . $\theta_P$ for P beams as shown in FIG. 3. Similarly, the direction of each axis 203 is further defined by its vertical angle $\phi_1$, $\phi_2$, . . . $\phi_P$ for P beams required to cover the entire guardshell.

Figure 5:
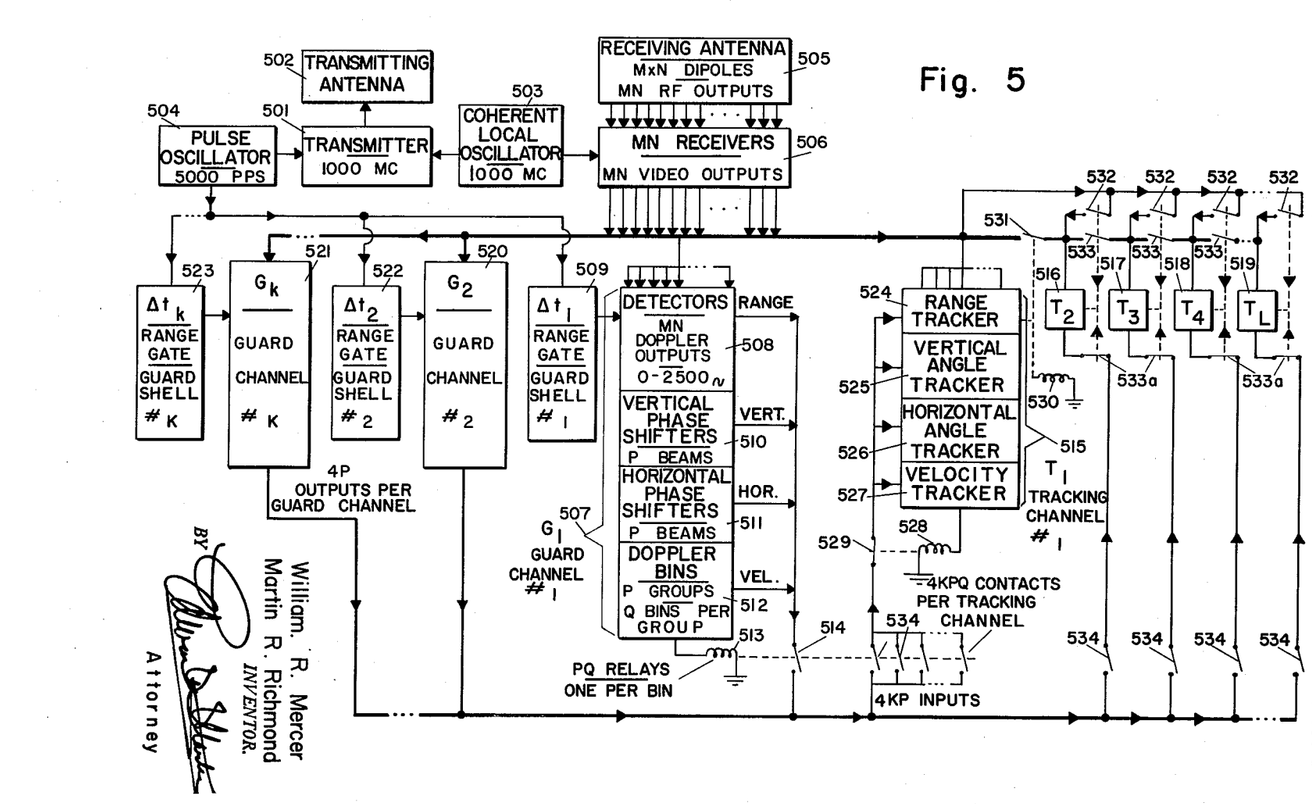
FIG. 5 is a schematic block diagram of a preferred embodiment of the present invention.

A detailed description of the system of the present invention will now be presented with particular references to FIGS. 5-11. In FIG. 5, a transmitter 501 operating, for example, at 1000 megacycles is coupled to a panoramic transmitting antenna 502. In the preferred embodiment the transmitter comprises a magnetron oscillator which is coupled to a coherent local oscillator 503 operating, for example, at a frequency of 1000 megacycles. A pulse oscillator 504, providing, for example, 5000 pulses per second is coupled to the transmitter and serves to key it on and off at that rate for 2 microseconds at a time.

A receiving antenna 505 comprises, in the preferred embodiment, a rectangular array of M columns by N rows of vertically disposed dipole elements. The individual antenna elements operate independently, hence the antenna provides a total of the product MN radio frequency outputs. Each of the antenna elements is coupled to its respective receiver in a group of a total of the product MN receivers 506. The coherent local oscillator 503 is also coupled to each of the receivers 506 in parallel. The receivers 506 provide a total of the product MN video outputs which are then applied in parallel to L tracking channels 515-519 ($T_1$, $T_2$, . . . $T_L$) and are simultaneously applied to K guard channels 507, 520 and 521 ($G_1$, $G_2$, . . . $G_K$) in parallel. The first guard channel 507 comprises an input circuit including in parallel a total of the product MN detectors 508. An output of the pulse oscillator 504 is applied through a first time delay circuit 509 ($\Delta t_1$=a first predetermined time interval) to provide range gates for the first guard shell which are applied in parallel to each of the detectors 508.

The detectors 508 are coupled to a group of vertical phase shifters 510 which provide a preferred vertical angle ($\phi_1$, $\phi_2$, . . . $\phi_P$) of response for each of P guard beams as indicated in FIG. 4. The detectors are also coupled to a group of horizontal phase shifters 511 which provide a preferred horizontal angle $\theta_1$, $\theta_2$, . . . $\theta_P$ for each of the P beams, as indicated in FIG. 3. Each guard beam $B_{ij}$ thus formed is then defined by horizontal and vertical angles $\theta_i$ and $\phi_j$, respectively, as indicated in FIGS. 2, 3, and 4. Each guard beam channel is coupled to one of P groups of Doppler alarm bins 512. There are a total of Q Doppler frequency bins in each group. The bins comprise narrow band filters as will be described in greater detail below. Each bin is connected to a relay 513 which, in the presence of a signal, is energized to close its contacts 514. The contacts 514 control the application of range, vertical angle, horizontal angle and velocity informations of a given target to each of the L tracking channels 515-519 ($T_1$ . . . $T_L$). The other (K-1) guard channels 520 and 521 ($G_2$, . . . $G_K$) are connected in parallel with the first guard channel 507 as shown and are substantially identical therewith. The output of the oscillator 504 is coupled to time delay circuits 522 and 523 ($\Delta t_2$, . . . $\Delta t_K$) which in turn provide range gates for their respective guard channels as shown.

The tracking channel 515 comprises a range tracker 524, a vertical angle tracker 525, a horizontal angle tracker 526 and a velocity tracker 527. The velocity tracker 527 includes a tracker disconnect circuit which energiezs a relay 528 to disconnect its own tracking channel from the guard channels by opening its contacts indicated at 529, when a target signal is received.

The range tracker 524 is connected to a relay 530 which has a normally open contact 531 which controls the application of video outputs of the receivers 506 to the tracking channel 516 as shown. Each of the tracking channels 516-519 ($T_2$, . . . $T_L$) have normally open holding contacts 532 which are connected in parallel with the contact 531, as illustrated, to provide continued application of the video output of the receivers 506 to each of the tracking channels. Each of the tracking channels 516-519 has a normally open relay contact 533 connected in series with the contact 531 and each of the tracking channels as shown. Each channel has a disconnect contact 533a corresponding with the contact 529 of tracking channel 515.

In the typical embodiment illustrated where, for example, a total of 60° of vertical angle and 360° of horizontal angle is to be searched, M, representing the columns of dipoles=100, N, representing the rows of dipoles=10, P, representing the beams formed=2400, Q, representing the Doppler bins=100, K, representing the guard channels=5 and L, representing the tracking channels=20. It will be apparent that each guard channel includes MN or 1000 detectors, 2400 vertical phase shifters, 2400 horizontal phase shifters, and PQ or 240,000 Doppler bins and alarm relays. Each of the guard channels is then capable of simultaneously producing 9600 control informations to each of the 20 trackers. Each tracker derives a possible input of a total of 48,000 control informations from the guard channels. Contacts 534 of the Doppler relay are connected in parallel and control the application of a given set of control informations to each of the trackers. As indicated in FIG. 5 there would be a total of 4KPQ or 4,800,000 contacts controlling each tracking channel.

Figures 6, 6A:
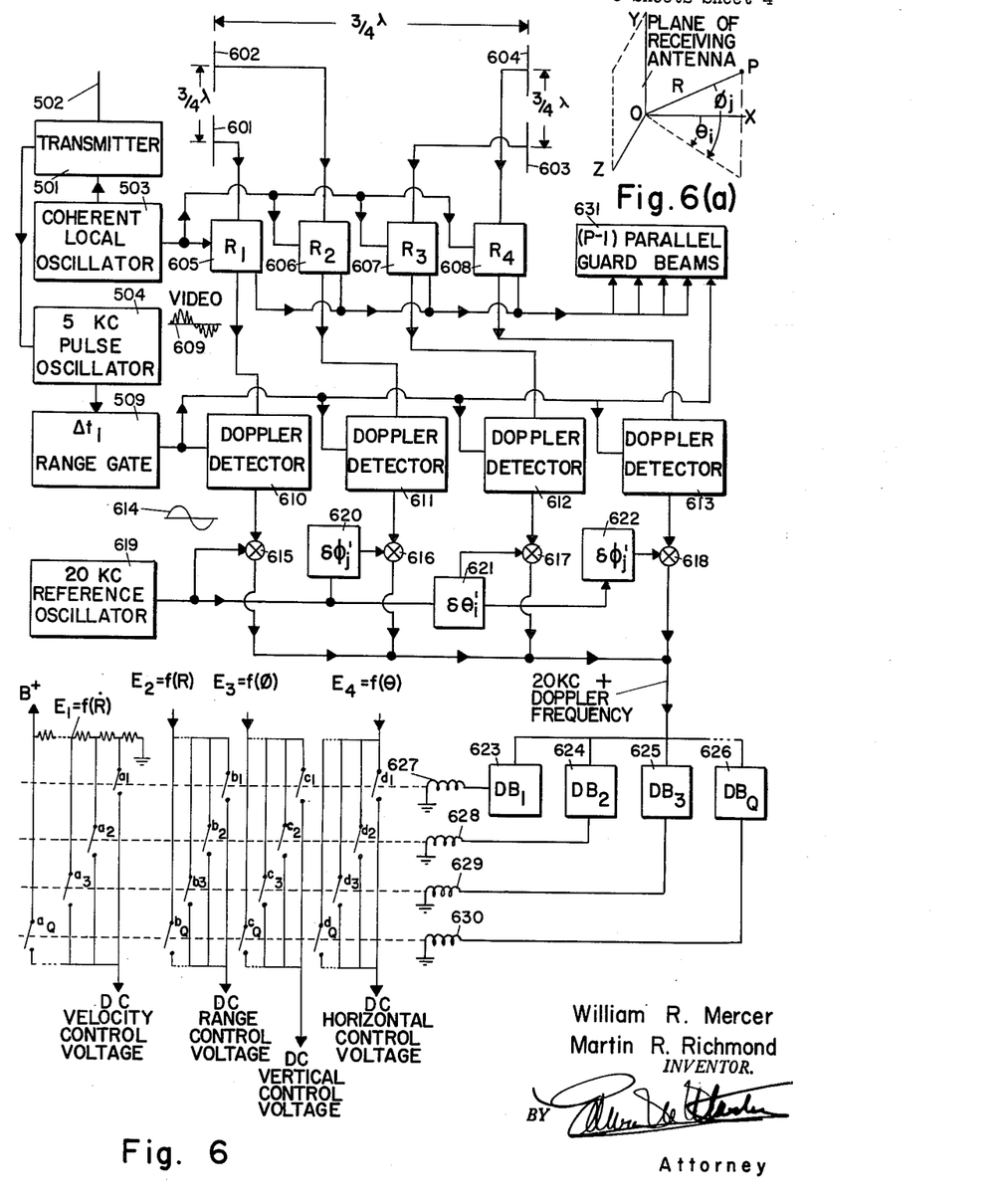
FIG. 6 is a simplified schematic block diagram of a guard channel utilized in the preferred embodiment of FIG. 5
FIG. 6(a) is a vector diagram for a guard beam.

FIG. 6 is a simplified schematic block diagram of a guard channel such as 507 shown connected to the transmitting and receiving circuits. FIG. 6(a) is a vector diagram illustrating a typical guard beam having a horizontal angle $\theta_i$ and vertical angle $\phi_j$ with respect to a point P on the guard shell of a range R. For convenience, the schematic block diagram is shown coupled to a simple 2 x 2 antenna array of dipoles 601, 602, 603 and 604 vertically disposed as shown. It will be apparent, however, that the conception of the embodiment of FIG. 6 is readily expandable into the M by N array. The dipoles 601, 602, 603 and 604 are disposed ¾ of a wavelength λ apart vertically and horizontally at the operating frequency as shown. The dipoles 601-604 are individually coupled to receivers 605, 606, 607 and 608, respectively. The coherent local oscillator 503 is connected in parallel with conventional input mixers in each of the receivers 605-608. The video outputs of each of the receivers has a wave form as indicated at 609. The video outputs are individually applied to Doppler detectors 610, 611, 612 and 613, respectively as shown. The detectors function in the well-known manner to provide the Doppler amplitude modulation envelope represented by wave forms 614 and eliminate the video pulses.

Range gates derived from the time delay circuit 509 are applied to each of the Doppler detectors in parallel as shown. The output Doppler frequency signals of the detectors 610–613 each have a wave form as indicated at 614 and are individually applied to mixers 615–618, respectively as shown. A reference oscillator 619 operating at a frequency, for example of 20 kilocycles, applies an input signal to each of the mixers 615–618 in parallel. The output circuit of the oscillator is directly coupled to the mixer 615. The output of the oscillator 619 is also coupled to the mixer 616 through a vertical phase shifter 620 which shifts the 20 kilocycle reference signal by a predetermined fixed number of degrees $\delta\phi_j'$, which corresponds to and is a function of the given vertical guard beam angle $\phi_j$. The output of the oscillator 619 is also coupled to the mixer 617 through to a horizontal phase shifter 621 which shifts its phase angle by a fixed, predetermined number of degrees $\delta\theta_i'$ where $\delta\theta_i'$ is a function of the given horizontal guard beam angle $\theta_i$. An output of the shifter 621 is coupled to the mixer 618 through a phase shifter 622 which also shifts the reference 20 kilocycle signal $\delta\phi_j'$. The outputs of mixers 615–618 are combined and applied to a group of Doppler alarm bins 623–626 ($DB_1$, $DB_2$, ... $DB_q$) which are connected in parallel as shown. Each bin is connected to its respective alarm relay 627–630. Each bin includes a narrow bandpass filter hereinafter considered in more detail. Each relay includes four normally open contacts $a$, $b$, $c$, and $d$, as shown. The contacts $a_1 \ldots a_q$ control the application of a D.C. voltage $E_1 = f(\dot{R}) = $ a function of velocity. The contacts $b_1 \ldots b_Q$ control the application of a fixed D.C. voltage $E_2 = f(R)$ which is a function of the range. The contacts $c_1 \ldots c_Q$ control the application of a fixed D.C. voltage $E_3 = f(\phi)$ which is a function of the vertical angle $\phi$. The contacts $d_1 \ldots d_Q$ control the application of a fixed D.C. voltage $E_4 = f(\theta)$ which is a function of the horizontal angle $\theta$.

There are (P−1) similar guard beam channels 631 connected in parallel with the video outputs of the receivers 605–608. In a similar manner the output of the time delay circuit 509 provides range gates which are applied in parallel to each mixer in the other guard beam channels. The D.C. velocity control $E_1$ is applied to a reactance tube 907, FIG. 9, to align the frequency of a velocity tracking oscillator 908 with the Doppler frequency as will be described in greater detail hereinafter. The D.C. range control voltage $E_2$ is applied to the input of a cathode followers 1104 in FIG. 11 to align the tracker range gates with the range gates of the guard shell #1 as will be described further. The D.C. horizontal control voltage $E_4$ is applied to an angle tracking linear multivibrator 916 in FIG. 9 to align the horizontal tracking angle with the angle of the guard beam. The D.C. vertical control voltage $E_3$ is applied to a similar angle tracking oscillator in a vertical tracking channel not shown.

Figure 8:
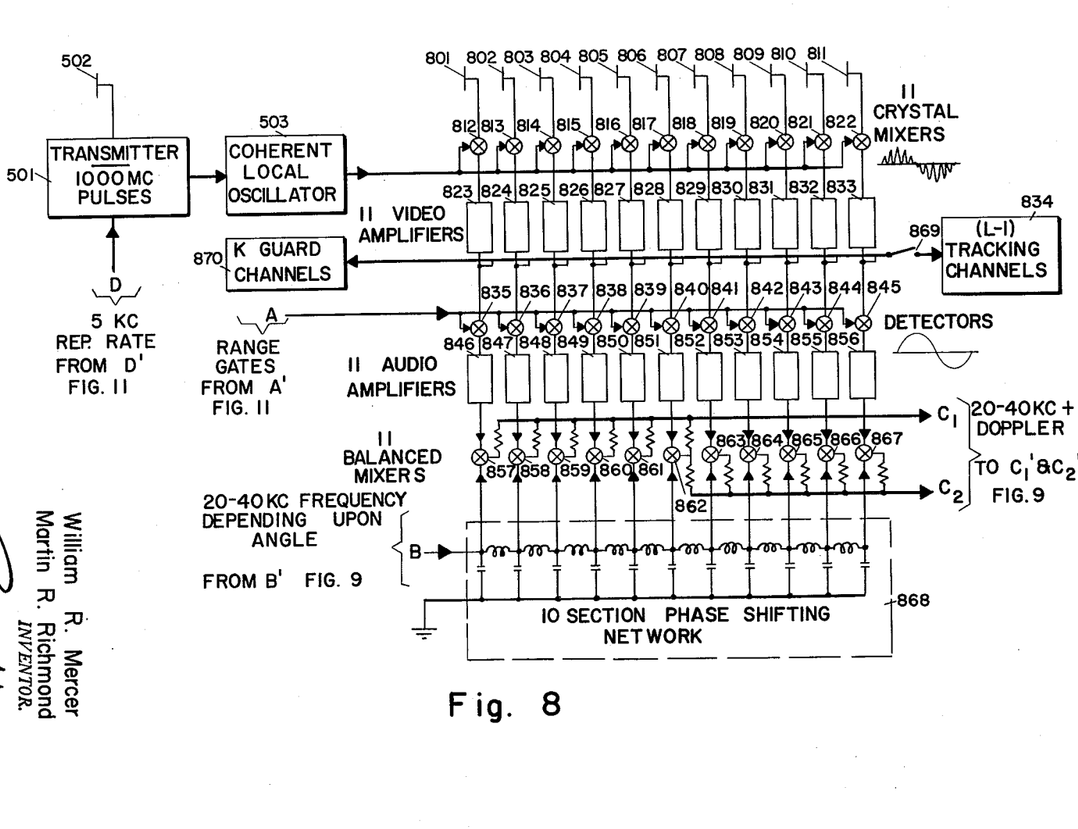
FIGS. 8, 9 10 and 11 taken together is a functional block diagram of the tracking channel utilized in the present invention.

The tracking channel 515 as shown in FIG. 5 will now be described in greater detail with particular reference to FIGS. 8, 9, 10 and 11. In FIG. 8 the tracking channel as shown is coupled to the transmitter 501, transmitting antenna 502, coherent local oscillator 503 and to the 5 kilocycle pulse oscillator 504 in FIG. 11. The range gate circuits in FIG. 11 are illustrated in greater detail than in FIG. 5.

The tracking channel as illustrated and described does not include vertical angle tracking. The combination of vertical and horizontal angle tracking is fully disclosed in the above-mentioned patent to Feldman et al. The present system differs in frequency from Feldman's in that an electronic phase-shifting network is employed in place of Feldman's mechanically rotated phase-shifting capacitors.

In FIG. 8, reflected energy is here shown as received by a linear MUSA array of eleven dipoles 801–811. As shown, the antenna is steerable horizontally. The antennas are individually coupled to crystal mixers 812–822, respectively. An output of the local oscillator 503 is connected in parallel with each of the mixers 812–822 as shown. The video outputs of the mixers are coupled to video amplifiers 823–833, respectively as illustrated. The video amplifiers provide common outputs connected in parallel with (L−1) parallel tracking channels as indicated by the block 834 and to the K guard channels 870.

The outputs of the video amplifiers are applied to the Doppler detectors 835–845 as shown. The detectors are enabled by 2 microsecond range gates coupled through the junctions A and A′ in FIG. 11 from the range gate amplifier 1110. The output Doppler frequency signals from the detectors are then coupled through audio amplifiers 846–856 to balanced mixers 857–867. The mixers 857–867 comprise conventional full-wave crystal bridge circuits. A phase shifting network 868 provides angle control signals to each of the mixers 857–867 as shown. Each successive control signal output from the network 868 differs in phase from its preceding control signal by an angle $\delta\theta'$ in accordance with the instantaneous horizontal angle $\theta$ of the direction of an acquired target. An input angle tracking control signal which varies in frequency from, for example, 20–40 kilocycles, is applied to the network through the junctions B and B′ in FIG. 9 from the angle tracking linear multivibrator oscillator 916 and low-pass amplifier 917. The variations in frequency from 20–40 kilocycles correspond, for example, with $\theta$ varying $\pm 90°$ from the boresight axis, which is orthogonal to the axis of the antenna array. When the tracking channel is unassigned the input signal to the network 868 has a frequency of 30 kilocycles. An output of the mixer 862 is coupled with the outputs from the mixers 857–861 to provide a tracking control signal which is applied through the junctions $C_1$ in FIG. 8 and $C_1'$ in FIG. 9 to a sum circuit 901 and a difference circuit 902. Another output of the mixer 862 is combined with the outputs of the mixers 863–867 and coupled through the junctions $C_2$ in FIG. 8 and $C_2'$ in FIG. 9 to difference circuit 902 as shown. The sum and difference circuits comprise a conventional, well-known transformer coupled resistance network providing an output velocity and range control signal equal to the sum of the control signals derived from the mixers 857–867 in FIG. 8 and another output angle error control signal equal to the difference between the above outputs of the mixers.

Figure 9:
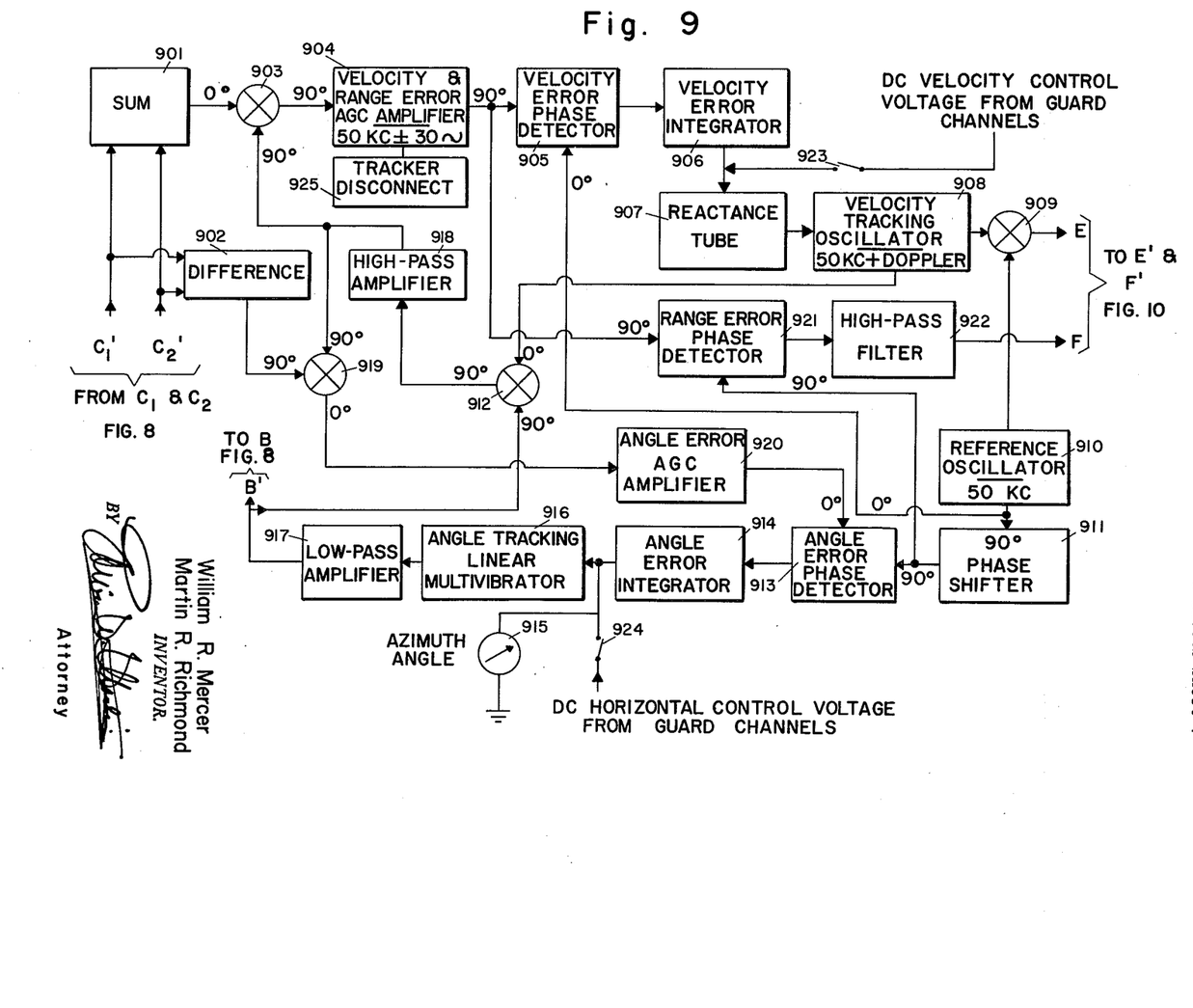

The sum circuit 901 in FIG. 9 provides an output velocity and range tracking control signal which is coupled to the mixer 903. The mixer is coupled to an automatic gain control (AGC) amplifier 904 having an input narrow bandpass filter, for example, 50 kilocycles ± 30 cycles. The amplifier 904 is coupled to a velocity error phase detector 905 which is connected to a velocity error integrator 906. The integrator applies a D.C. voltage to a reactance tube 907. The tube 907 controls the variable frequency velocity tracking oscillator 908 to operate, for example, at 50 kilocycles plus Doppler. An output of the oscillator 908 is applied to a mixer 909. The oscillator 908 is also coupled to a mixer 912 which derives another input from the reference oscillator 910. Another input of the mixer 909 is derived from a reference oscillator 910 which operates at a frequency, for example, of 50 kilocycles.

An output of the oscillator 910 is coupled to the velocity error phase detector 905. Another output of the oscillator 910 is applied to 90° phase shifter 911. An output of the shifter 911 is applied to an angle error phase detector 913. Another output of the shifter 911 is applied to a range error phase detector 921. The other input to the detector 921 is derived from the amplifier 904 as shown. The output of the detector 913 is applied to an angle error integrator 914 which is connected to a direct reading azimuth angle meter 915. The integrator 914 controls a variable frequency angle tracking linear multivibrator 916 to operate, for example, at a frequency between 20 and 40 kilocycles. The D.C. horizontal control voltage from the guard channels is connected through a contact 924 to the multivibrator 916.

The output of the multivibrator 916 is applied through a low-pass amplifier 917 to the mixer 912. As noted above, another output of the amplifier 917 is applied through the junctions B and B' in FIG. 8 to the phase shifting network 868. The output of the mixer 909 is applied through the junctions E and E' in FIG. 10 to a low-pass filter 1001 in FIG. 10. The mixer 912 is coupled to a high-pass amplifier 918 and provides a control signal having an intermediate frequency equal to the sum of its inputs, for example, 70–90 kilocycles plus Doppler. The amplifier 918 is coupled to the mixers 903 and 919 as shown. The range error phase detector 921 is coupled to a high-pass filter 922. The filter output is applied through the junctions F in FIG. 9 and F' in FIG. 10 to another range error phase detector 1007. The D.C. velocity control voltage is applied from the guard channels through the contact 923 to the input of the reactance tube 907 to synchronize the oscillator 908 with the Doppler frequency signal.

Figure 10:
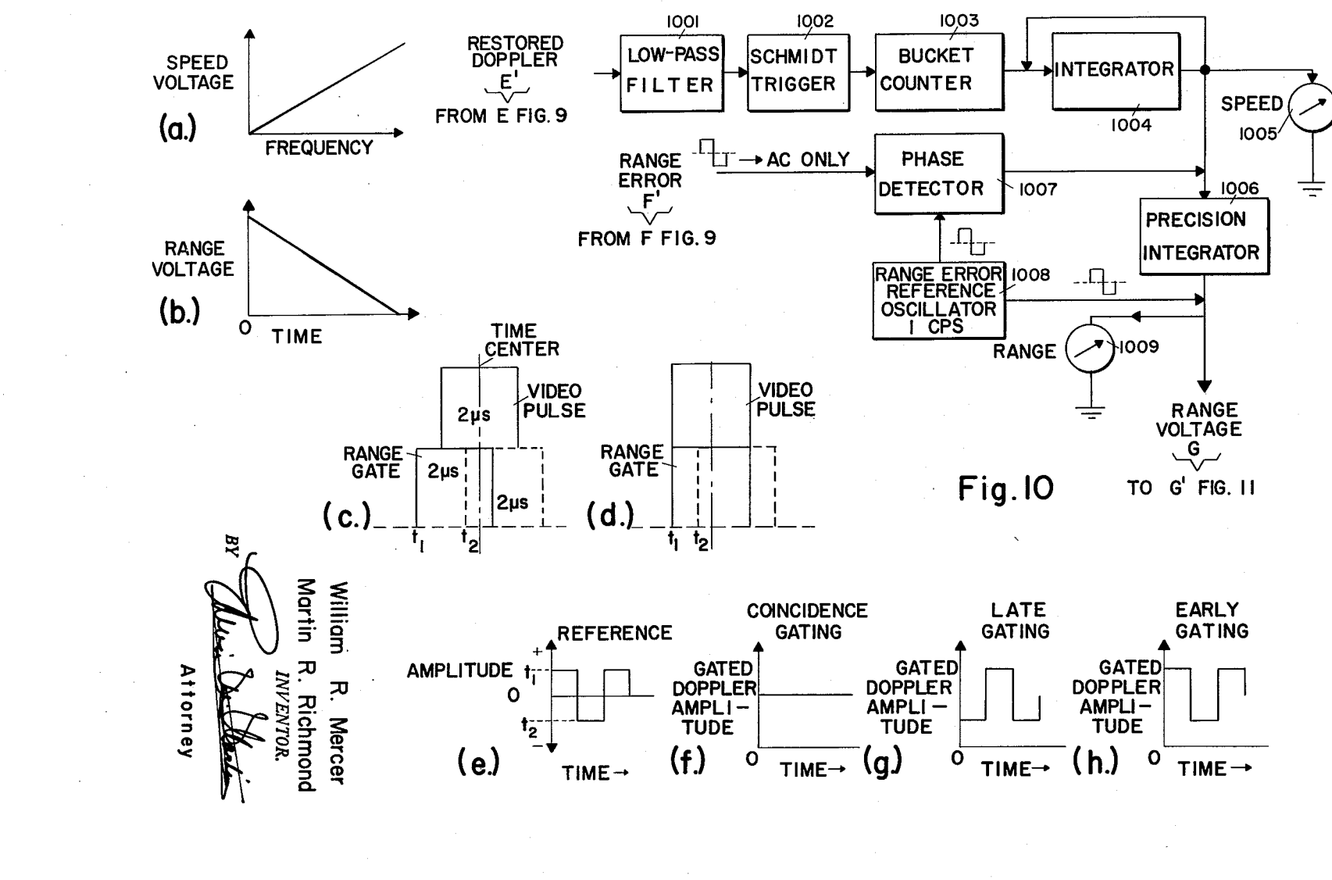
Figure 11:
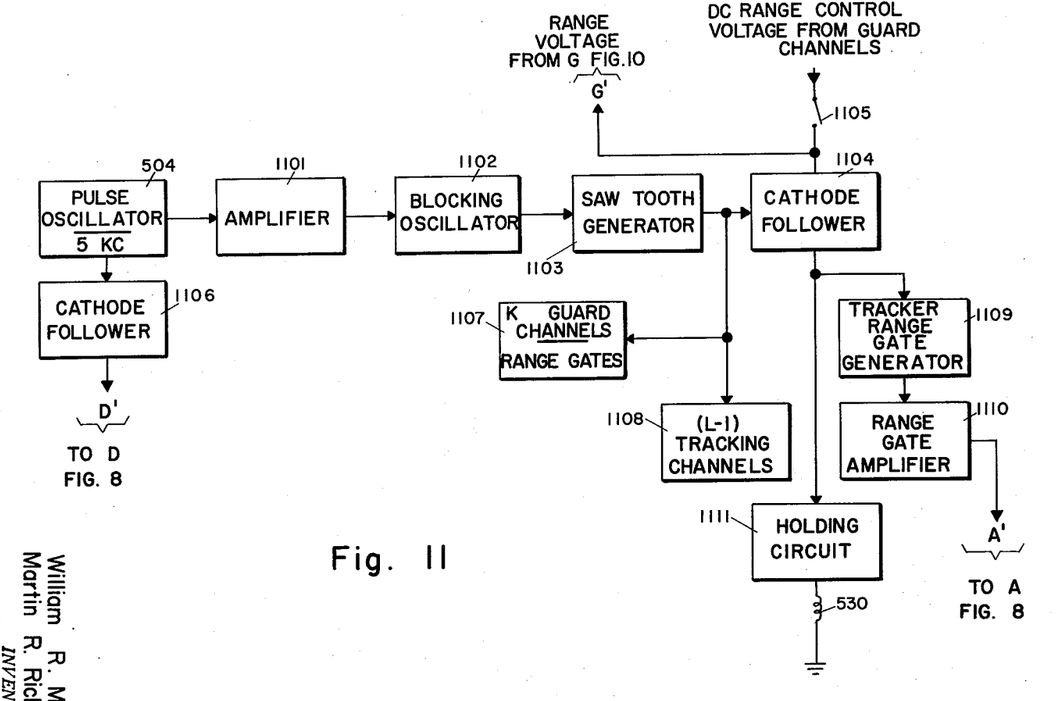

The output of the filter 1001 in FIG. 10 is applied to a well-known Schmitt trigger circuit 1002 (as described in "Electronics Experimental Techniques," by Elmore and Sands, McGraw-Hill Book Co., Inc., 1st edition, 1949). The trigger circuit 1002 is coupled to a bucket counter 1003 (shown on page 615 of "Waveforms," vol. 19, of Radiation Laboratory Series, McGraw-Hill Book Co., Inc., 1949), which cooperates with an integrator 1004 as shown to produce an output voltage that varies linearly with respect to an input Doppler frequency as indicated in FIG. 10(a). The integrator 1004 is connected to a meter 1005 indicating instantaneous speed. An output of the integrator 1004 is applied to a precision integrator 1006 which produces a voltage output providing instantaneous range as indicated by the meter 1009 and graphically presented in FIG. 10(b). The range error phase detector 921 in FIG. 9, as noted above, applies a range error control signal through the high-pass filter 922 and the junctions F and F' (FIG. 10) to the phase detector 1007. A 1-cycle-per-second range reference oscillator 1008 produces a square wave voltage output as indicated which is coupled with the range voltage output of the integrator 1006 and applied through the junctions G and G' (FIG. 11) to a cathode follower 1104. An input of the detector 1007 is coupled to the oscillator 1008. Its output is applied to the input of the integrator 1006 as shown.

In FIG. 11 the pulse oscillator 504 provides modulation pulses at the rate of 5000 pulses per second which are applied to a cathode follower 1106. The output of the follower 1106 is coupled through the junctions D and D' (FIG. 8) to the transmitter 501. Another output of the oscillator 504 is applied to the amplifier 1101 which is coupled to a blocking oscillator 1102. The output of the oscillator 1102 controls the development of a sawtooth voltage by a sawtooth generator 1103. For a guard shell having a radius of 10 miles, the period of the sawtooth voltage output of the generator 1103 is greater than 100 microseconds. The sawtooth voltage is applied to a cathode follower 1104. Another input of the follower 1104 is derived through the junctions G and G' (FIG. 10) thereby applying the range voltage. Another output of the sawtooth generator 1103 is connected in parallel with K guard channels 1107 and the other (L–1) tracking channels 1108. The D.C. range control voltage from the guard channels is applied through the tracker assignment contact indicated at 1105 to the cathode follower 1104 as shown. An output of the follower 1104 is applied to a holding circuit 1111 which controls a relay 530 as also shown in FIG. 5 and described above. Another output of cathode follower 1104 is applied to a tracker range gate generator 1109. The generator 1109 is coupled to a range gate amplifier 1110. The range gate output of the amplifier 1110 is applied through the junctions A and A' (FIG. 8) to the detectors 835–845 as described above.

SYSTEM OPERATION

The operation of the preferred embodiment will now be described with particular reference to FIGS. 5 and 6.

*Coherent transmission and reception*

The transmitter 501 operates at a frequency of, for example, 1000 megacycles as determined in phase by the coherent local oscillator 503 which primes the magnetron oscillator in the transmitter at a low energy level. The pulse oscillator 504 provides high power modulation pulses at the rate of 5000 per second to key the transmitter on for intervals, for example, of 2 microseconds. The pulses of energy provided by the transmitter 501 are said to be coherent as between pulses since the phase of the energy in each successive pulse *at the time of transmission* is determined by the coherent local oscillator 503. By heterodyning the energy of the local oscillator 503 with received energies, coherent detection is provided from which the incremental Doppler frequency signal may be derived. The output pulses of microwave energy are coupled to the panoramic transmitting antenna 502 and radiated omnidirectionally. In the presence of a target, the receiving antenna 505 produces a total of the product MN radio frequency outputs which are coupled to a total of the product MN receivers 506. Each radio frequency output is heterodyned with an output of the coherent local oscillator 503 in a mixer included in its respective receiver.

*Target search and detection*

The resultant video outputs thus obtained comprise groups of pulses which are amplitude modulated at the Doppler frequency caused by a moving target. The guard channels 507, 520 and 521 each provide, for example, 2400 guard beams which intersect the respective guard shells to provide primary target detection within contiguous volume increments. As illustrated in FIGS. 2, 3 and 4, each guard beam $B_{ij}$ has a fixed horizontal angle $\theta_i$ (where $i=1, 2, \ldots P$) and a fixed vertical angle $\phi_j$ (where $j=1, 2, \ldots P$) associated therewith. The guard beams are keyed on for 2 microseconds by the range gate associated with each guard shell. Assuming the guard shells to have radii of, for example, 10 miles, 7.5 miles and 5 miles, the corresponding time delays ($\Delta t_1$, $\Delta t_2$, $\ldots \Delta t_K$) for each range gate are 100 microseconds, 75 microseconds and 50 microseconds, respectively. Each guard beam is then able to detect a moving target in a volume increment, for example, of approximately 1000 feet x 1000 feet x 1000 feet for a given guard shell. A moving target within such an increment causes reflected energy to be received in a given guard beam channel from which a Doppler frequency alarm signal is derived. At this time, none of the tracking channels 515–519 has been assigned to the tracking of the target and the system is relatively quiescent.

The appearance of a moving target in the guard ring is indicated in the guard channel by the presence of a Doppler frequency. This provides an alarm signal. In the preferred embodiment, each guard channel is responsive to velocities varying from 0 to 750 miles per hour represented by Doppler frequencies of 0 to 2500 cycles. This result is based upon the relation at a 1000 megacycle carrier frequency of the incremental Doppler frequency with the velocity in miles per hour. At a carrier frequency of 1000 megacycles, the frequency increment is approximately 3⅓ cycles per mile per hour of velocity. Each group of Q Doppler bins associated within a guard beam channel contains, for example, 100 bins which are responsive to the velocity range of 0 to 750 miles per hour in velocity increments of 7.5 miles per hour (corresponding with a bandpass characteristic of each bin of 25 cycles).

The effective signal-to-noise ratio of the system for a given signal is a function of the capture area as provided by the receiving antenna. The more elements utilized by the receiving antenna, the larger the signal-to-noise ratio becomes, or inversely, the greater the useful range of the system for a given power output. The signal-to-noise ratio is further enhanced by utilizing extremely narrow band Doppler information to indicate the presence of a target.

Tracker assignment

Tracker assignment takes place only during the time that a moving target is passing through a guard shell. The probability of detection during that interval is dependent to some extent on the relative radial velocity between the target and the receiver. Although the probability of target detection is relatively high, for example 98 percent, it may be desirable for some applications to increase the probability of target detection by adding a plurality of guard channels. For most applications a single guard shell is sufficient.

When an alarm signal is present indicating the presence of a moving target, a tracker is assigned to intercept and track the target. This occurs at the time the target is within a guard shell, the area of primary detection, as shown in FIG. 1. The relay 513 associated with each Doppler bin is energized to apply range, vertical angle, horizontal angle and velocity information signals to a tracking channel which is not busy. The tracking channel has its own disconnect contact; for example, contact 529 of tracking channel 515, which is normally closed. When the tracking channel is busy, that is, when it has already acquired a target, the contacts indicated at 529 are open and preclude its being energized by subsequent targets.

Assuming that the tracking channel 515 is not busy, the contacts 514 of the relay 513 close and apply range, vertical angle, horizontal angle and velocity control informations to the range, vertical angle, horizontal angle and velocity trackers 524–527, respectively. These informations prescribe the initial conditions to which the tracking channel must align itself. After the tracking channel is aligned and enabled to follow the target, its disconnect relay 528 is energized to open the contacts indicated at 529. After the target has passed through the guard shell the range tracker 524 energizes its enabling relay 530 which closes its contact 531 to permit tracking channel 516 ($T_2$) to be assigned to subsequent targets. When the tracking channel 516 is enabled in accordance with the appearance of a subsequent target, its disconnect relay is energized and opens its contact 533a to remove that channel from the guard channel. After its target has been acquired and passed through the guard shell, its holding circuit is energized and causes a contact 533 to permit the assignment of a tracking channel 517 to a target. Its holding contact 532 is closed at the same time to prevent its being disabled by the disabling of the tracking channel 515.

It will be noted from the above description that the embodiment of the present invention as presented in FIG. 5 is capable of detecting the presence of a total of the product (K guard channels, P guard beams per channel and Q Doppler bins per beam) KPQ targets simultaneously. Thus, where K is chosen to be 5, P to be 2400 and Q to be 100, one arrives at the extraordinary result of an inherent ability to detect the presence of 1,200,000 targets simultaneously. The number of targets which can be acquired and tracked is limited only by the number of tracking channels available.

Since the informations are essentially digital, it is to be noted that a digital computer may be utilized readily for the purpose of tracker assignment.

Guard channel

Referring now to FIG. 6 the operation of a typical guard channel will be discussed in greater detail. In FIG. 6(a) OZ is the horizontal, OY the vertical and OX the boresight axes of the receiving antenna. The dipole elements 601 and 602 are in linear alignment relative to the horizontal angle $\theta_i$ of a given guard beam. Similarly, the dipole pairs 601, 603 and 602, 604 are linearly aligned relative to the vertical angle $\phi_j$ of a given guard beam $B_{ij}$.

It will be apparent that a guard beam (a virtual or phantom beam associated with a preferred direction of response) is formed by suitably phasing the outputs derived from each of the dipoles 601–604. Assuming the output of the dipole 601 to be characterized by 0° phase, the phases of the outputs of the other dipoles are adjusted to coincide with that of the dipole 601. Thus, the output of the dipole 602 differs in phase relative to the dipole 601 by an incremental angle $\delta\phi'$ which corresponds to and is a function of the vertical angle $\phi$. The output of the dipole 604 likewise differs by the incremental phase angle $\delta\phi'$. Analogously, the output of the dipoles 603 and 604 differ in phase by an incremental angle $\delta\theta'$ which corresponds to and is a function of the horizontal angle $\theta$. It is to be noted that the output of the dipole 603 differs in phase relative to that of the dipole 601 by both incremental angles $\delta\phi'$ and $\delta\theta'$. The Doppler frequency outputs of each of the detectors 610–613 retain these phase relations.

Phase shifting is accomplished in the preferred embodiment by utilizing a reference frequency of, for example, 20 kilocycles which is injected into the mixers 615–618 through suitable phase shifters. The radio frequency output of the dipole 601 is applied to a mixer in the receiver 605. The output of the coherent local oscillator 503 is applied to the mixer and heterodyned with the received energy to produce a video output from the receiver 605 having a wave form as indicated at 609. The video output is applied to a detector 610 which is gated on from the output of the time delay circuit 509 ($\Delta t_1$). The output of the detector 610 is a Doppler frequency signal arbitrarily chosen as characterized by 0° phase. The output of each Doppler detector is applied to its respective mixer 615–618 as shown. The 20 kilocycle reference signal is applied directly to the mixer 615 to produce an output intermediate frequency signal of 20 kilocycles plus the Doppler frequency at 0° phase. Another 20 kilocycle reference signal output of the oscillator 619 is applied to a phase shifter 620 which shifts its phase by $\delta\phi'$. This phase shifted 20 kilocycle signal is applied to the mixer 616 and is heterodyned against the Doppler signal from the detector 611 to produce an intermediate frequency signal in the output of the mixer 616 of 20 kilocycles plus the Doppler frequency signal in phase with the output of the mixer 615. The 20 kilocycle reference frequency is also applied through a horizontal phase shifter 621 which shifts the energy by an incremental phase angle $\delta\phi'$. The output of the shifter is then applied to the mixer 617 and heterodyned against the Doppler frequency signal appearing at the output of the detector 612. The Doppler of the output of the detector 613 associated with the dipole 604 must be corrected for both vertical and horizontal phase deviations. The 20 kilocycle reference signal is applied through the horizontal phase shifter 621 and then through the vertical phase shifter 622 to shift that energy a total phase angle of ($\delta\theta' + \delta\phi'$). The energy thus shifted is mixed with the Doppler output of the detector 613 in the mixer 618 and combined with the outputs of the other detectors as shown.

The combined in phase energies are then applied to a group of Q Doppler bins 623–626 ($DB_1, DB_2, \ldots DB_Q$). Each of the bins contains a very narrow band filter which passes only the energy having a frequency deviating only relatively slightly from the center frequency of the filter. Each Doppler bin responds to a velocity increment of 7.5 miles per hour which corresponds to a Doppler frequency increment of 25 cycles. Thus, the first bin is tuned to a frequency of 20.0125 kilocycles and will pass the frequency range from 20.000 to 20.025 kilocycles. The bin 624 is tuned to pass a contiguous frequency range of 20.025 to 20.050 kilocycles and so forth.

A relative radial velocity of 7.5 miles per hour may readily be realized, for example, in the case of a target aircraft approaching an observing aircraft from the rear. Assuming a Doppler frequency of 12.5 cycles, the bin 623 will pass the resultant 20.0125 kilocycle alarm signal to energize its respective tracker assignment relay 627. As noted above its contacts $a_1$, $b_1$, $c_1$ and $d_1$ apply the D.C. velocity, range, vertical and horizontal control voltages respectively to an unassigned tracking channel. It is to be emphasized that the above-mentioned control voltages are associated with the detection of a target within a fixed volume increment of a specified guard shell. As represented by the parallel guard beam channels 631, if a 2400 beam system is being employed 2399 other guard beams are provided in each guard channel differing only in the horizontal angle $\theta$ or vertical angle $\phi$ (or both).

*Target tracking*

The automatic target tracking system as illustrated in FIGS. 8, 9, 10 and 11 provides continuous target velocity, range and horizontal angle informations. Since simultaneous vertical and horizontal angle tracking is adequately described in the patent to Feldman et al., a detailed discussion of vertical angle tracking is unnecessary herein.

Figure 7:
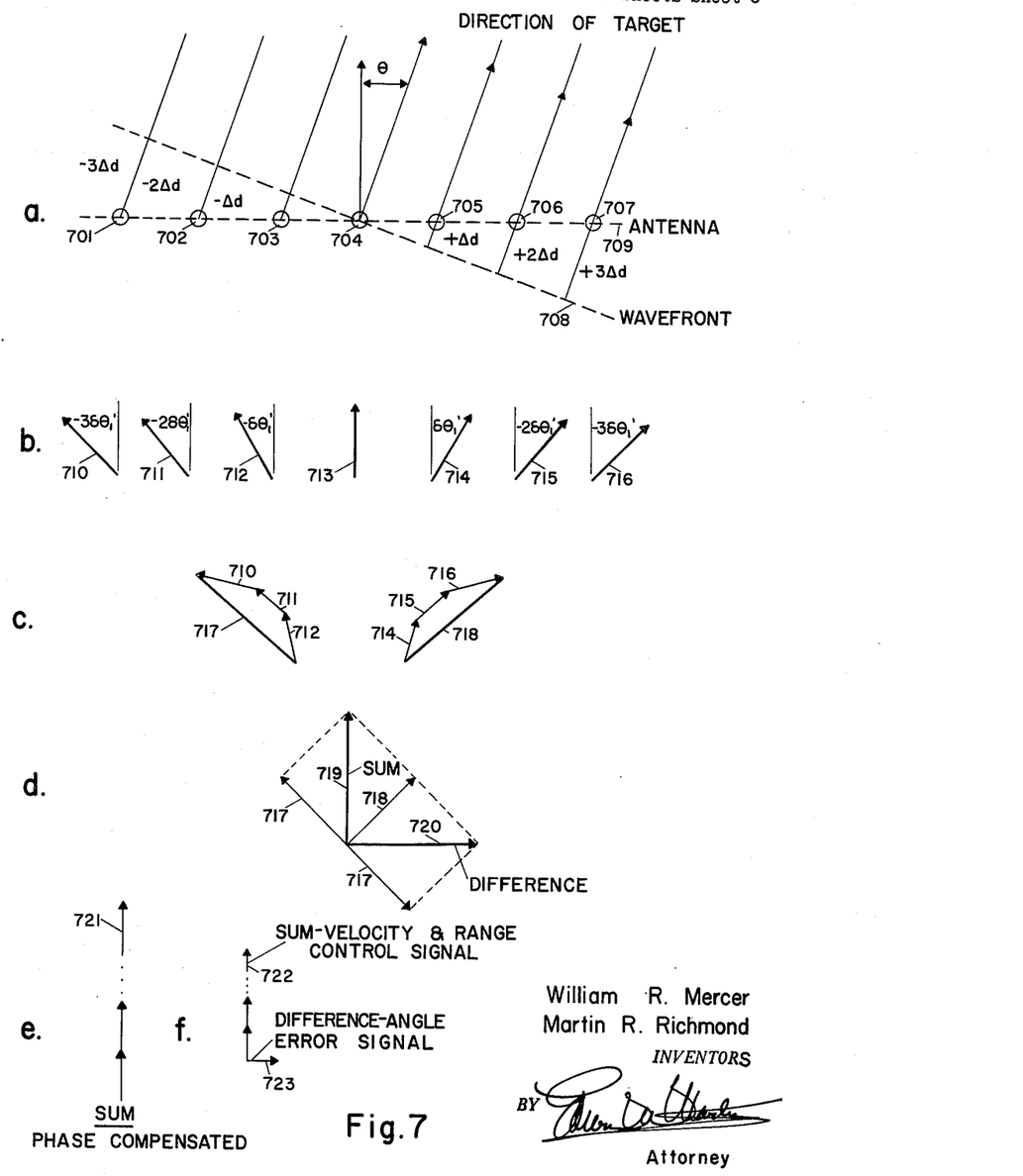
FIG. 7 is a group of schematic vector diagrams illustrating the application of MUSA principles to the present invention.

In FIG. 7(a) a schematic diagram of energy received from a target incident upon a receiving antenna array of seven dipoles 701–707 is presented. The diagrams (b), (c), (d), (e) and (f) vectorially present the phase relations of the radio frequency outputs of the dipoles. The wavefront of a wave of energy reflected from a target at a horizontal angle $\theta$ is indicated at 708. The horizontal axis of the receiving antenna is indicated at 709. It is to be emphasized that here the angle $\theta$ is *continuously variable* in accordance with the motion of a target. It will be noted that relative to the dipole 704, dipoles 705, 706 and 707 intercept the wavefront earlier than dipoles 701, 702 and 703. The energy intercepting the dipole 704 travels farther than that of the dipole 705 by an incrmental distance $\Delta d$. By triangular symmetry, the received energies of the other dipoles travel an integral number of incremental distances $\Delta d$. They are indicated as ± relative to the dipole 704. Hence, each dipole receives a signal which differs in phase from that of the element 704 by an integral number of phase angle increments $\delta\theta'$. The energies arriving at the elements 705, 706 and 707 are said to lead that arriving at the element 704 (accordingly marked +) and the energies arriving at the elements 701, 702 and 703 are said to lag that of the element 704 by an integral number of phase increments (accordingly marked —). As illustrated by the diagram of FIG. 7(b), the vectors 710–716 correspond with the energies of the dipoles 701–707, respectively, and illustrate the relative phases of these incident energies. The vectors 710, 711 and 712 are combined in FIG. 7(c) to provide a resultant signal represented by the vector 717. The vectors 714, 715 and 716 are combined to provide a resultant signal represented by the vector 718. As shown in FIG. 7(d) the vectors 717 and 718 are added to provide a resultant control signal vector 719, or substracted to provide a resultant control signal vector 720. It will be noted that the vectors 719 and 720 are at quadrature.

By shifting the phases of response of each of the elements 701–703, 705–707 to correspond with the element 704, the difference vector 720 reduces to 0. This is the condition realized when the virtual tracking beam (preferred direction of reception) is precisely directed on target indicated in FIG. 7(e) by the vector 721. When the energies are not quite colinear, a difference vector 723 results to provide an angle error control signal at quadrature with the principal control signal vector 722 as indicated in FIG. 7(f). The principal control signal as represented by the vector 722 provides a velocity and range control signal. The control signals are utilized by the automatic target tracker of the system as described below.

While the description for purposes of clarity has been limited to the angle tracking problem in the azimuth plane, it will be apparent that a similar analysis is applicable to angle tracking in elevation and it is unnecessary to describe the same in detail herein.

The transmitter 501 as shown in FIG. 8 is pulse modulated by the high level modulation pulses as coupled from the 5 kilocycle pulse oscillator 504 as shown in FIG. 11. The transmitted energy is again shown maintained coherent by the coherent local oscillator 503 which, for example, continuously primes a magnetron oscillator in the transmitter 501. The receiving antenna is here shown as comprising an eleven dipole, horizontal array. Each of the dipoles 801–811 is connected to its respective crystal mixer 812–822. An output of the local oscillator 503 is applied to the mixers in parallel as shown. The local oscillator operates at a frequency of 1000 megacycles. Its output is hetreodyned with the incoming pulses of energy which are characterized by a frequency of 1000 megacycles plus or minus an incremental Doppler frequency caused by the presence of a moving target, which either moves away from or toward the receiver.

If no target is present, no output is derived from the crystal mixers. In the presence of a moving target, the mixers produce output pulses of energy recurring at the 5 kilocycle rate and modulated in amplitude by the Doppler frequency as indicated. The amplitude modulated pulses are amplified by the video amplifiers 823–833. The video output is shown applied in parallel with (L−1) other tracking channels 834 through an enabling contact 869 and K guard channels 870. The Doppler detectors 835–845 are enabled by range gates which are 2 microseconds wide as derived from the tracker range gate amplifier 1110 in FIG. 11.

*Angle tracking*

A closed loop for tracking horizontal error includes the received target signals as derived from the output of the balanced mixers 857–867, the phase-shifting network 868 in FIG. 8 and in FIG. 9 the difference circuit 902, the mixer 919, the angle error automatic gain control (AGC) amplifier 920, the 50 kilocycle reference oscillator 910, the phase shifter 911, the angle error phase detector 913, the angle error integrator 914, the angle tracking linear multivibrator 916, the low-pass amplifier 917, the mixer 912, the velocity tracking oscillator 908 and the high-pass amplifier 918. The closed loop for velocity and range tracking hereinafter described is closely coupled with the angle error tracking loop; a complete description, therefore, involves both.

The angle error is derived by utilizing simultaneous lobing techniques wherein each lobe is substantially represented by the sum of vectors 717 and 718 in FIG. 7. The detectors 835–845 (FIG. 8) provide output Doppler frequency signals as indicated. For convenience, a Doppler frequency of 500 cycles, corresponding to a target velocity of approximately 150 miles per hour, is assumed. The Doppler frequency signals are amplified by the audio amplifiers 846–856. The outputs of the audio amplifiers are applied to the balanced mixers 857–867 which comprise conventional crystal bridge mixer circuits. The phase-shifting network 868 applies an angle tracking control signal of 20–40 kilocycles to each of the mixers 857–867 at an integral number of incremental phase shifts $\delta\theta'$, corresponding with the instantaneous horizontal angle $\theta$ of the direction of the target. Since the network is properly matched for this frequency range, the amount of phase shift per section varies directly in accordance with the variation of frequency.

For convenience, an angle tracking control frequency of 20 kilocycles is assumed, corresponding with a given azimuth angle $\theta$. A frequency of 30 kilocycles, in the preferred embodiment, is chosen to correlate with the direction of a target on boresight (zero azimuth angle). Frequencies above 30 kilocycles correspond with targets to the right and frequencies below 30 kilocycles correspond with targets to the left ($\pm \theta$ respectively). Accordingly, utilizing 20 kilocycles as an assumed frequency implies a target far in the left-hand quadrant. The balanced mixers 857–867 heterodyne the 20 kilocycle control signal and the 500 cycle Doppler to provide output control signals of 20.5 kilocycles (intermediate frequency plus Doppler). The outputs of the mixers 857–861 are summed with one-half the output of the mixer 862 to provide one of the two virtual tracking beam lobes. The outputs of the balanced mixers 863–867 are summed in combination with the other half of the output of the mixers 862 to provide the second tracking lobe.

The tracking control voltages corresponding with the two virtual beam lobes, as substantially represented by the vectors 717 and 718 (FIG. 7), are coupled through the points $C_1$, $C_2$ and $C_1'$, $C_2'$ (FIG. 9) to the sum circuit 901 and difference circuit 902. The output of the sum circuit 901 substantially corresponds with the vector 722 in FIG. 7. The output of the difference circuit 902 is the angle error tracking control signal substantially corresponding with the angle error vector 723 in FIG. 7. Sum circuit 901 provides the range and velocity tracking control signal. It will be apparent from the description of FIG. 7 that the two tracking control signals are in phase quadrature.

The vector corresponding to the difference between the input control signals after phase compensation is zero; that is, no angle error signal exists when the virtual tracking beam lobes are directed precisely on target. However, when a small error exists, such that the output of the two lobes do not provide energies which may be represented by co-linear vectors because of insufficient phase angle compensation, an error signal corresponding to the vector 723 is produced. This difference voltage or angle error tracking control signal is applied from the output of difference circuit 902 to a mixer 919 as shown.

The error signal (20.5 kilocycles) is heterodyned with the 70.5 kilocycle output of the high-pass amplifier 918 to produce a difference frequency signal of 50 kilocycles. To establish how the 20 kilocycle angle tracking control signal is derived from the low-pass amplifier 917, the circuit involving the AGC amplifier 920, the velocity tracking oscillator 908, the mixer 912, the reference oscillator 910, the phase shifter 911, the angle error phase detector 913, the integrator 914, the angle tracking multivibrator 916 and the low-pass amplifier 917 will now be described.

The mixer 919 produces a 50 kilocycle intermediate frequency signal (70.5–20.5 kilocycles) which is applied to the angle error AGC amplifier 920. The output of the reference oscillator 910 is taken to be at 0° relative to the velocity control voltage output of the sum circuit 901. The inputs to the detector 919 as derived from the difference circuit 902 and the high-pass amplifier 918 (which is coupled through intermediate circuits as shown to the output of the 90° phase shifter 911) are both at 90°; hence, the phase of the output of the mixer 919 is at 0°. The amplifier 920 includes in its input circuit a narrow band 50 kilocycle ± 30 cycle filter. The output of the amplifier 920 is applied to the phase detector 913. The two inputs to the angle error phase detector 913 are in quadrature as indicated; hence, the detector 913 is a nulling detector; that is, no output is produced when the input signals are locked in phase quadrature. If there exists an angle error the detector 913 produces a positive or negative angle error control voltage, which is applied to the integrator 914. The output of the integrator 914 is a control voltage which is a measure of absolute azimuth angle as indicated by the meter 915. The output of the integrator 914 is applied to the angle tracking variable frequency linear multivibrator 916, which produces a square wave voltage in its output at a frequency that is correlated with the control voltage applied from the integrator 914.

As noted above, the frequency of operation of the multivibrator 916 is 30 kilocycles at the time that no deviation between the direction of the virtual beam lobes and the direction of the target exists. The multivibrator 916 is aligned by the D.C. horizontal control voltage from a guard channel which is applied when a target indication occurs through the assignment contact 924 as shown. The 20 kilocycle angle tracking control signal output of the multivibrator 916 is then applied through the low-pass amplifier 917 to provide substantially a sine wave output. The 20 kilocycle angle tracking control signal thus produced is applied through the junctions B and B' (FIG. 8) to the phase shift network 868. It is also applied to the mixer 912 to produce an intermediate frequency which is the sum (70–90 kilocycles plus Doppler) of the output of the velocity tracking oscillator 908 and the 20 kilocycle angle tracking control signal.

The velocity tracking oscillator 908 is aligned to 50.5 kilocycles (50 kilocycles intermediate frequency plus Doppler) by the D.C. velocity control voltage from a guard channel coupled through the contact 923 to the reactance tube 907. Tracing through angle tracking loop, the tube 907 controls the frequency of the oscillator 908 in accordance with the Doppler frequency. The output of the oscillator 908 is heterodyned in the mixer 912 with the 20 kilocycle angle tracking control signal output of the amplifier 917. The two inputs to the mixer 912 are summed in frequency (here 70.5 kilocycles) and aplied to the high-pass amplifier 918. The output 70.5 kilocycle signal of the amplifier 918 is then heterodyned in the mixer 919 with the 20.5 kilocycle input angle error control signal to produce the difference 50 kilocycle intermediate frequency signal about which the system serves.

If the virtual beam is precisely on target, no input angle error control signal exists to apply to the mixer 919. If, however, an input angle error signal is presented to the mixer 919, the signal is amplified by the AGC amplifier 920 and applied to the angle error phase detector 913. The output of the detector 913 is integrated and applied to the multivibrator 916 to shift its frequency and compensate for the angle error. The signal thus derived is applied through the low-pass amplifier 917 and coupled through the junctions B and B' (FIG. 8) to the phase shifting network 868. As described above, the resultant shift in frequency of the angle tracking control signal applied to the network 868 produces an incremental phase shift applied to each of the mixers 857–867 to compensate for the angle error. In the case of a moving target there is always an angle error; consequently, the virtual tracking beam follows the target continuously.

*Velocity tracking*

The velocity tracking loop starting with the output of the sum circuit 901 in FIG. 9 includes the mixer 903, the velocity tracking AGC amplifier 904, the velocity error phase detector 905, the velocity error integrator 906, the reactance tube 907, the velocity tracking oscillator 908, the mixer 912, the high-pass amplifier 918, the mixer 909, the reference oscillator 910 and the angle error circuit involving the angle error tracking multivibrator 916 as outlined above. As previously stated, the velocity tracking oscillator 908 is aligned by the velocity control voltage from the guard channel through the contact 923. The oscillator 908 operates at 50 kilocycles plus the Doppler frequency, herein taken to be 50.5 kilocycles in accordance with the assumed 500 cycle Doppler frequency signal.

The 20.5 kilocycle velocity and range control signal output of the sum circuit 901 is applied to the mixer 903 together with the 70.5 kilocycle signal from the high-pass amplifier 918 to produce the difference 50 kilocycle intermediate frequency signal (50=70.5−20.5) in its output. The 50 kilocycle intermediate frequency signal is amplified by the AGC amplifier 904. An output of the amplifier 904 enables the tracker disconnect circuit 925 which comprises, for example, a control relay which has normally closed contacts in series with the guard channel control voltages as described in connection with FIGS. 5 and 6.

Another output of the amplifier 904 is applied to the velocity error phase detector 905. An input 50 kilocycle reference signal from the oscillator 910, is applied at 0° phase to the detector 905. The detector 905 is a nulling device since its input signals are 90° out of phase, as indicated, causing the detector 905 to produce no velocity error control signal when they are locked in phase quadrature. The output of the detector 905 is a velocity error control signal which has a definite polarity in accordance with the input signals approaching 0° or 180° phase relation. The velocity error control signal is applied to the velocity error integrator 906, integrated and applied to the reactance tube 907, which controls the frequency of oscillation of the tracking oscillator 908.

If the velocity error exists, the integrated error control voltage increases or decreases to change the reactance of the tube 907 and shift the tracking oscillator 908 to the correct Doppler frequency in the well-known manner. The output of the mixer 912 varies in frequency correspondingly and is applied through the amplifier 918 to the mixer 903 to adjust the input signals to the detector 905 into phase quadrature and cancel the error signal thereby providing an automatic frequency control. In this manner, the output of the oscillator 908 continuously follows the velocity of the target.

The tracking oscillator 908 is coupled to the mixer 909 which derives an input 50 kilocycle reference signal from the oscillator 910. The assumed output 50.5 kilocycle signal of the velocity tracking oscillator 908 is heterodyned in the mixer 909 with the 50 kilocycle reference signal to obtain a difference frequency signal and restore the assumed 500 cycle Doppler frequency. The mixer 909 continuously provides the Doppler frequency in its output and shifts in accordance with variations of the Doppler frequency produced by the relative motion of a target.

The actual indication of the instantaneous velocity is obtained by applying the Doppler frequency through the junctions E and E' (FIG. 10) to a low-pass filter 1001. The output of the filter 1001 is applied to the Schmitt trigger circuit 1002 which produces a square wave voltage output. The square wave is coupled to a circuit well-known in the art as a bucket counter 1003 and integrator 1004 which cooperate to produce an output voltage which varies with frequency as shown in FIG. 10(a). This voltage is applied to a meter 1005 to produce a direct reading indication of speed. The low-pass filter 1001, the trigger circuit 1002, the counter 1003 and the integrator 1004 in combination provide a means for converting an input A.C. signal to a direct voltage which varies as a function of the frequency of the input A.C. signal.

*Range tracking*

The range tracking loop includes the velocity tracking loop as outlined above, the integrator 1006, the range error phase detector 1007, the 1-cycle-per-second range reference oscillator 1008, the pulse oscillator 504 in FIG. 11, the amplifier 1101, the blocking oscillator 1102, the sawtooth voltage generator 1103, the cathode follower 1104, the tracker range gate generator 1109 and the range gate amplifier 1110 which controls the function of the Doppler detectors 835–845 in FIG. 8.

The pulse oscillator 504 provides trigger pulses which are amplified by the isolation amplifier 1101 to trigger a blocking oscillator 1102. The oscillator 1102 is coupled to a sawtooth voltage generator 1103 which produces an output sawtooth control signal at the repetition rate, for example, of the transmitted pulses and with a period sufficiently long to provide range gates for the guard shell with the greatest radius, for example, greater than 100 microseconds where the guard shell has a radius of ten miles the sawtooth voltage is applied to a cathode follower 1104 which is a summing device or may be a conventional amplitude comparator.

Referring now to FIG. 10, the output of the integrator 1004 is applied to a precision integrator 1006 which provides an output range control voltage as shown in FIG. 10(b). Since the initial range is determined by the guard channel as will be described below, the range voltage varies inversely relative to time. The range control voltage, in effect, predicts the decreasing range of the target in accordance with its velocity. As mentioned above the range $$R = D - \int_0^t v\,dt$$

that is, the range is equal to the radial distance from the receiver to the guard shell minus the relative radial distance traveled.

The range voltage is coupled through the junctions G and G' (FIG. 11) to the cathode follower 1104. In the preferred embodiment the sawtooth output of the generator 1103 is added to the range voltage by the follower 1104 to provide a control voltage which triggers the tracker range gate generator 1109. The voltage triggers are applied to the generator 1109 at time intervals after the transmitted pulses corresponding with the range of the target. The generator 1109 is coupled to the range gate amplifier through the junctions A and A' (FIG. 8) to gate on the detectors 835–845 in the well-known manner.

The range gates are initially triggered by the application of the D.C. range control voltage from a guard channel through the contact 1105. Another output of the cathode follower 1104 is applied to a holding circuit 1111 which energizes, for example, the holding relay 530 and enables the next tracking channel as described in connection with FIG. 5. The holding circuit 1111 operates after the target has left the guard shell as determined by the control voltage output of the follower 1104. The contact 1105 in series with the follower 1104 is opened by the tracker disconnect circuit 925 in FIG. 9 after the target has been acquired.

The generator 1103 also provides the sweep voltage for the range gates of the K guard channels 1107 as well as for the other (L–1) tracking channels 1108.

The range voltage as derived from the integrator 1006 in FIG. 10 is determinable to only a finite order of accuracy. Since the range voltage is produced by an open loop integrating circuit, any error in the system is cumulative and would cause the loss of the target.

To counteract errors in range, the range reference oscillator 1008 applies a square wave voltage as indicated, for example one cycle per second, to the range gate voltage. The amplitude of the reference square wave voltage is so chosen as to cause the range gate to oscillate in time position, for example, ± ten percent of the pulse width. If no range error exists the central time position of the range gates coincide with the video pulses as shown in FIG. 10(c). The amplitudes of the Doppler frequency signals remain constant for both time positions of the range gates. In this event, no amplitude modulation of the velocity and range control signal takes place as shown by coincidence gating curve in FIG. 10(f).

When there exists a range error such as late gating as shown in FIG. 10(d), the Doppler signal outputs of the amplifiers 846–856 are amplitude modulated in accordance with the late gating curve in FIG. 10(g) relative to the reference signal output of the oscillator 1008 as shown in FIG. 10(e). The resultant amplitude modulations appears in the output of the mixers 857–867 and is coupled through the junctions $C_1$, $C_2$ and $C_1'$, $C_2'$ (FIG. 9) through the sum circuit 901 to the mixer 903. The mixer passes the modulated signal to provide an amplitude modulated 50 kilocycle intermediate frequency signal which is applied through the amplifier 904 to the range error phase detector 921. Since the two inputs to the detector 921 are in phase as indicated, it produces a maximum D.C. voltage output which is amplitude modulated. The D.C. is eliminated by the high-pass filter 922 and the square wave modulation voltage is coupled through the junctions F and F' (FIG. 10) to the phase detector 1007. The detector 1007 derives another input from the reference oscillator 1008. When the two inputs are 180° out of phase (FIGS. 10(e) and (g)), the detector 1007 produces a negative D.C. voltage in its output which is integrated to decrease the slope $dV_R/dt$ of the curve in FIG. 10(b) of the range voltage relative to time. This has the effect of restoring the range gates into coincidence with the received target signals.

If the range gate precedes in time position the occurrence of a target signal, the range and velocity control voltage is amplitude modulated as shown in FIG. 10(h) (early gating). The phase reversal causes the detector 1007 to produce a positive voltage output which is integrated to increase the slope $dV_R/dt$ of the range voltage relative to time.

From the above description it will be apparent that the system of the present invention is ideally suited for an early warning radar. The invention as disclosed is also clearly applicable to problems involving airport traffic control.

The present system presents a solution to the problem of target search, detection and tracking which is a radical departure from the prior art. The conception is fundamental and has wide application.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all such changes and modifications as fall fairly within the scope of the present invention, as defined in the appended claims, are to be considered as a part of the present invention.

What is claimed is:

1. A non-scanning, panoramic radar system, comprising: transmitting means for substantially isotropically radiating electromagnetic energy; receiving means for substantially isotropically receiving reflected electromagnetic energy from a plurality of remote targets; means coupling said transmitting and receiving means whereby indications may simultaneously be produced of the presence and directions of a plurality of remote targets, and independent tracking means coupled to said receiving means and assignable to one of said targets in response to said indications while enabling said system simultaneously to respond to other targets.

2. A non-scanning, panoramic radar system, comprising: transmitting means for substantially isotropically radiating electromagnetic energy having predetermined phase characteristics; receiving means for substantially isotropically, receiving reflected electromagnetic energy from a plurality of remote targets; guard shell means coupled to said transmitting and receiving means for controlling said receiving means to limit the time of reception of said reflected energy relative to the time of their transmission to permit target signals only from a predetermined range increment; and means coupling said transmitting and receiving means for detecting variations in phases of said reflected energy from corresponding phases of said energy as radiated, whereby indications may simultaneously be produced of the presence and directions of a plurality of remote targets, and of the velocities and ranges of said targets.

3. A non-scanning, panoramic radar system, comprising: transmitting means for substantially isotropically radiating pulses of electromagnetic energy; receiving means for substantially isotropically receiving reflected electromagnetic energy from a plurality of remote targets; guard shell means coupled to said transmitting and receiving means controlling said receiving means to limit the time of reception of said reflected pulses relative to the time of their transmission to permit target signals only from a predetermined range increment, and means coupling said transmitting and receiving means for detecting variations in characteristics of said reflected energy from corresponding characteristics of said energy as radiated, whereby indications may simultaneously be produced of the presence and directions of a plurality of remote targets, and of characteristics of said targets; and independent tracking means coupled to said receiving means and assignable to one of said targets in response to said indications while enabling said system simultaneously to respond to other targets.

4. A non-scanning, panoramic radar system, comprising: transmitting means for substantially isotropically radiating electromagnetic energy having predetermined phase characteristics; receiving means for substantially isotropically receiving reflected electromagnetic energy from a plurality of remote targets; guard shell means coupled to said transmitting and receiving means controlling said receiving means to limit the time of reception of said reflected energy relative to the time of their transmission to permit target signals only from a predetermined range increment; and means coupling said transmitting and receiving means for detecting variations in phase characteristics of said reflected energy from corresponding phase characteristics of said energy as radiated, whereby indications may simultaneously be produced of the presence and directions of a plurality of remote targets, and of the velocities and ranges of said targets; and independent tracking means coupled to said receiving means and assignable to a target in response to said indications for continuously tracking variations in phase characteristics while enabling said system simultaneously to respond to other targets.

5. A non-scanning, panoramic radar system comprising: antenna means for substantially isotropically radiating electromagnetic energy; transmitter means coupled to said antenna means for generating a high-frequency electromagnetic signal; receiving antenna means having a matrix of dipole elements disposed in a rectangular array to produce a plurality of radio frequency signals; a plurality of receivers each responsive to a separate one of said radio frequency signals, each of said receivers having a heterodyning mixing circuit to produce video frequency signals; coherent oscillator means coupling said transmitter means and the mixer circuit of each of said receivers for producing phase coherence between said transmitted and said received signals; Doppler frequency detector circuits each responsive to a separate one of said signals to provide Doppler frequency signals; pulse oscillator means coupled to said transmitter means and said Doppler detectors for activating said transmitter means and said Doppler detectors only during predetermined periodic time intervals recurring at a predetermined rate to provide a guard shell and initially define the range of acquired targets; a plurality of vertical phase shifters responsive to one said Doppler frequency signals to produce vertical virtual beams; a plurality of horizontal phase shifter means responsive to said Doppler frequency signals to produce horizontal virtual beams, said vertical and horizontal phase shifters thereby enabling an indication of the vertical and horizontal directions of a target; groups of Doppler bins, each having a plurality of bins per group for selecting one of said Doppler frequency signals in accordance with its frequency; alarm means responsive to said selected signal for providing an alarm as to the presence of a target; tracking means responsive to said video frequency signals and including range, vertical angle, horizontal angle and velocity tracking means; and tracker assignment means controlled by said alarm means for assigning said tracker means to an acquired moving target to produce continuous indications of the range, vertical angle, horizontal angle and velocity of said acquired target whereby the presence, direction, velocity, and range of a plurality of remote targets may be simultaneously initially determined and continuous indications of the range, direction and velocity of selected targets may be produced.

References Cited by the Examiner

UNITED STATES PATENTS

| | | | |
|---|---|---|---|
| 2,457,199 | 12/1948 | Best | 343—112.4 |
| 2,688,743 | 9/1954 | Berger et al. | 343—9 |
| 2,847,666 | 8/1958 | Berger | 343—8 |
| 3,014,215 | 12/1961 | Macdonald | 343—13 |

CHESTER L. JUSTUS, *Primary Examiner.*

FREDERICK M. STRADER, NORMAN H. EVANS, *Examiners.*